Oct. 27, 1964   J. L. ESSENBURG   3,154,705
BALANCE WEIGHT ARRANGEMENT FOR DYNAMOELECTRIC MACHINES
Filed May 29, 1961   3 Sheets-Sheet 2
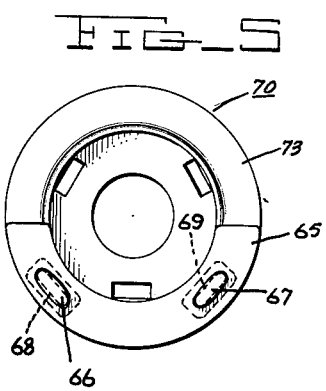
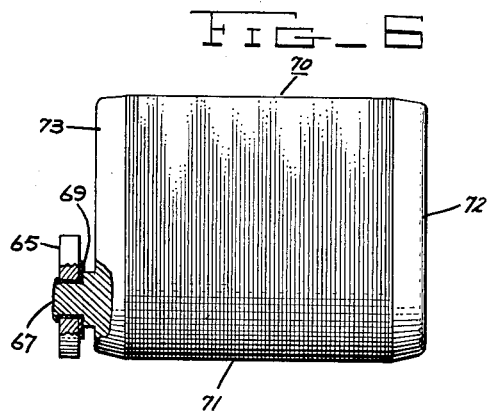
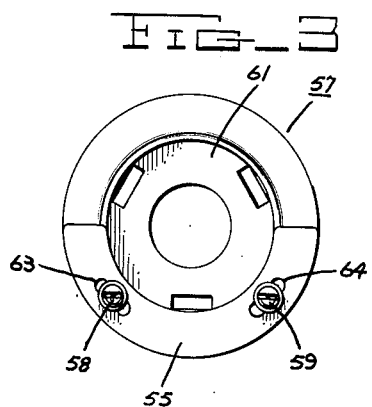
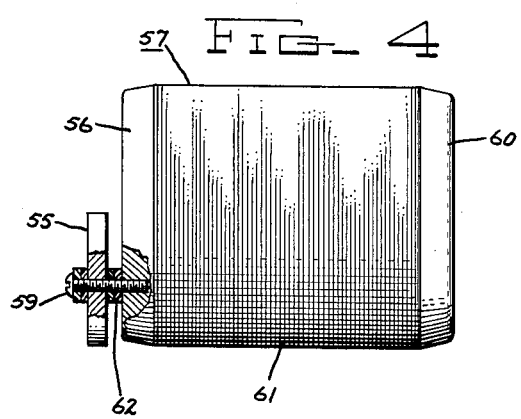
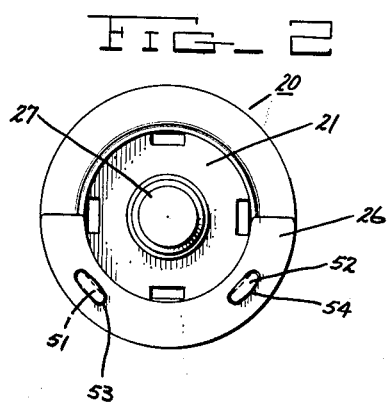
Inventor:
Jack L. Essenburg
by Henry J. Marciniak
Attorney.

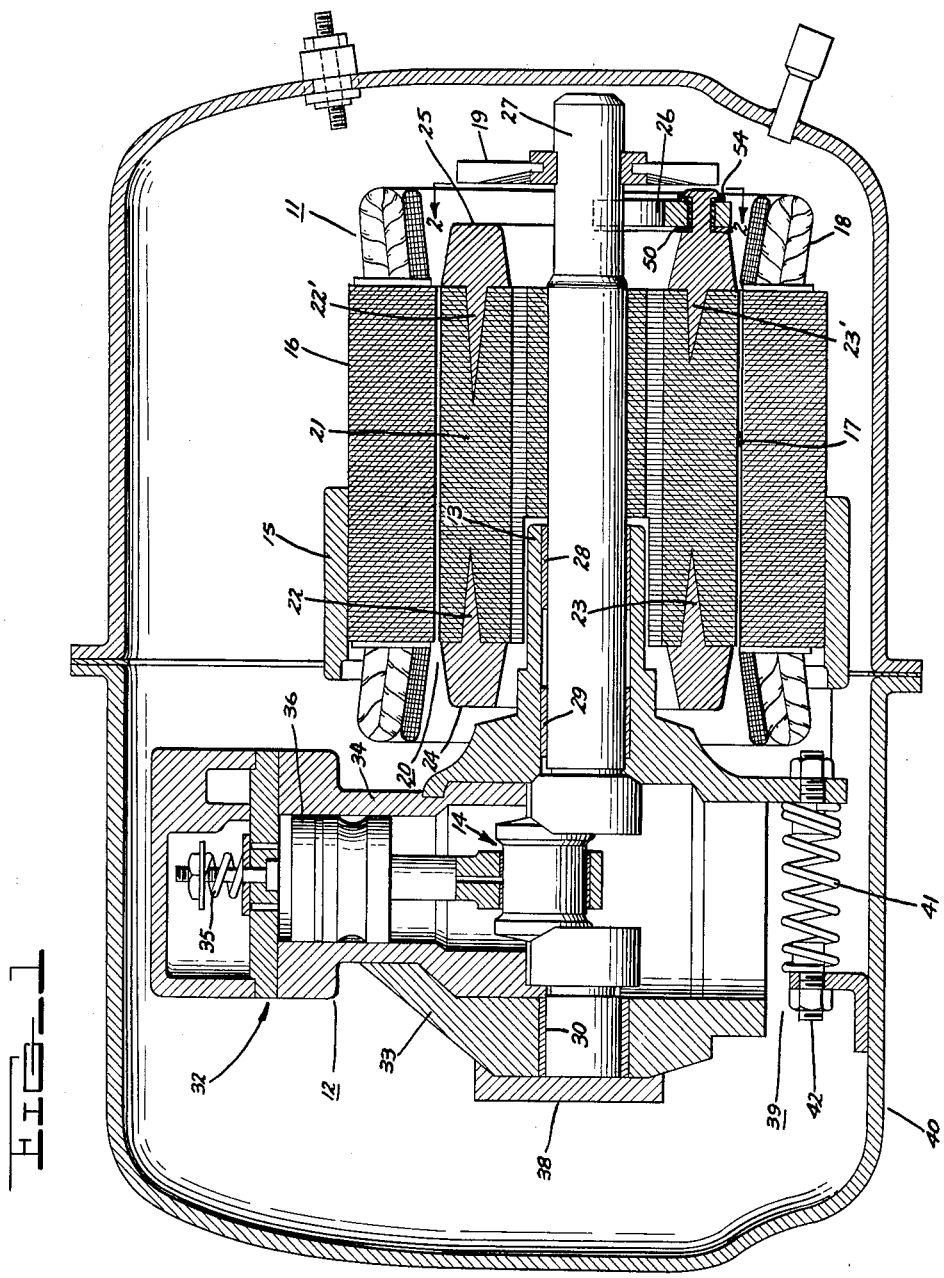

Oct. 27, 1964         J. L. ESSENBURG         3,154,705
BALANCE WEIGHT ARRANGEMENT FOR DYNAMOELECTRIC MACHINES
Filed May 29, 1961                                3 Sheets-Sheet 3
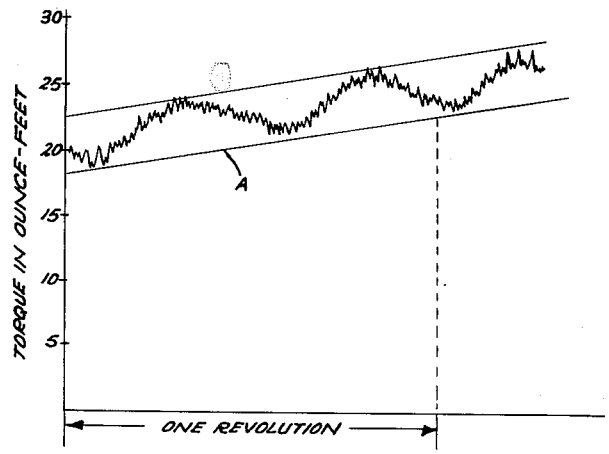
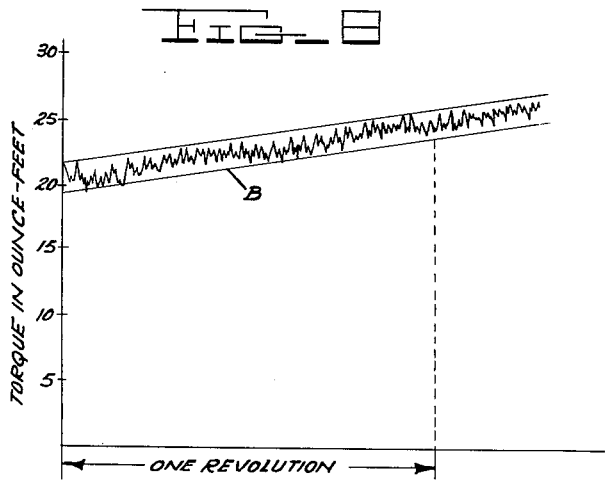
Inventor:
Jack L. Essenburg,
by Henry J Marasinek
Attorney.

United States Patent Office 3,154,705
Patented Oct. 27, 1964

3,154,705
BALANCE WEIGHT ARRANGEMENT FOR
DYNAMOELECTRIC MACHINES
Jack L. Essenburg, Holland, Mich., assignor to General
Electric Company, a corporation of New York
Filed May 29, 1961, Ser. No. 113,423
7 Claims. (Cl. 310—51)

My invention relates to a balance weight arrangement for dynamoelectric machines and more particularly to such an arrangement for use in small dynamoelectric machines such as electric motors.

In many applications of electric motors, it is necessary that balance weights be attached to the rotor assembly to compensate for an unbalance in the rotor or an unbalance in the mass system with which the rotor is associated. Where the motor is employed to drive a machine, such as a single piston compressor, the crankshaft of the compressor introduces a dynamic unbalance into the system. Generally, a balance weight is attached to the motor rotor and located at a proper axial location from the crankshaft so as to provide the counterbalancing force required to achieve a dynamic balance in the system.

Difficulty has been experienced in the past when balance weights of appreciable magnitude are attached to a motor rotor because as the balance weight rotates through the magnetic field set up by the stator, the starting torque characteristics of the motor are adversely affected. Generally, the effect on the starting torque is proportional to the amount of the material used in the balance weight, the location from the rotor laminations and the location of the weights from the centroid of the current circulating through the rotor end rings during operation of the motor. Thus, the provision of a satisfactory balance weight arrangement for a motor rotor that will not adversely affect the starting torque of a motor is a continuing problem in the motor industry, particularly in connection with applications where relatively heavy balance weights are required to compensate for the unbalance in the mass system with which the motor is associated.

A common type of small motor that is extensively used is the squirrel cage induction motor. It has a stator, a rotor assembly mounted on a shaft and bearing assembly for rotatably supporting the rotor assembly. The rotor assembly is generally formed of a plurality of laminations which are firmly held in assembled relation by a squirrel cage structure which includes a plurality of rotor conductors extending through the motor laminations and integrally joined to rotor end rings disposed along the end radial faces of the rotor assembly.

Such constructions of squirrel cage induction motors are well known. In applications where it is required that a squirrel cage induction motor rotor introduce an unbalance in the system, one or more steel balance weights are attached to a rotor end ring. The rotor end ring to which a steel balance weight is to be attached, may have integrally formed thereon rivet lugs for the purpose of supporting the balance weight. Thus, the steel balance weight is securely attached to the end ring by peening the ends of the rivet lugs. Such a mounting arrangement of the prior art has not been entirely satisfactory since as the balance weights rotate through the magnetic field, a sharp decrease occurs in the starting torque as compared with the starting torque of a similar motor which does not have balance weights. Even where nonmagnetic material has been used for balance weights, a decrease in starting torque was found to occur. It is apparent, therefore, that it is desirable that a balance weight arrangemment be provided for motors that will not have an adverse effect on the performance characteristics thereof.

Accordingly, a principal object of my invention is to provide an improved balance weight arrangement for a motor rotor wherein the rotor is required to introduce an unbalance in order to provide a dynamic balance in the mass system with which the rotor is associated.

It is another object of my invention to provide an improved balance weight mounting arrangement for a motor whereby during operation the performance characteristics of the motor are not detrimentally affected as the balance weight is rotated through the magnetic field of the motor stator.

Another object of my invention is to provide an improved balance weight mounting arrangement whereby the starting torque of the motor is not caused to decrease as the balance weight rotates through the magnetic field of the stator.

In carrying out my invention in one form thereof, I provide a balance weight mounting arrangement for an electric motor wherein one or more balance weights of nonmagnetic material are attached to a rotor end ring to provide a predetermined amount of unbalance and are electrically insulated from the rotor end ring. In addition to other advantages to be hereinafter more fully described, it was found that the starting torque was not appreciably affected when a balance weight of magnetic material was attached to the rotor end ring but electrically insulated therefrom in accordance with the invention.

In another aspect of the invention, I have provided an arrangement wherein the balance weight is spaced axially from the rotor end ring and attached thereto by an attaching means which provides an insulated support for the balance weight.

The subject matter which I regard as my invention is particularly pointed out and distinctly claimed in the concluding portion of this specification. In my invention, however, both as to organization and method of operation, together with further objects and advantages thereof, may be best understood by reference to the following description taken in conjunction with the accompanying drawings in which:

FIG. 1 is a longitudinal sectional view of an electric motor and a compressor showing a useful application of my new and improved balance weight arrangement in one form thereof;

FIG. 2 is a full end view of the motor rotor assembly shown in FIG. 1 as seen along line 2—2 of FIG. 1;

FIG. 3 is an end view of a motor rotor illustrating a modification of the invention;

FIG. 4 is a side view of the motor rotor shown in FIG. 3;

FIG. 5 is an end view of a motor rotor illustrating another modification of the invention;

FIG. 6 is a side view of the motor rotor shown in FIG. 5;

FIG. 7 represents a plot of the locked rotor torque measurements in ounce feet for one revolution of the rotor shown in FIGS. 1 and 2 employing a steel balance weight conventionally mounted thereon; and FIG. 8 represents a plot of the locked rotor torque measurements in ounce feet for one revolution of the rotor shown in FIGS. 1 and 2 of the improved balance weight arrangement in accordance with the invention.

Referring now to the drawing and more specifically to FIG. 1, there is illustrated therein one form of the invention as it is applied to a squirrel cage induction type of motor 11 used to drive a single piston compressor 12. A unit bearing assembly 13 rotatably supports the motor 11 and a crankshaft and piston assembly 14 of the compressor 12.

The support for the stator core member 16 of the motor 11 is provided by an outer cylindrical shell member or frame assembly 15. Rigidly associated with the shell member 15 is the unit bearing assembly 13. The stator core member 16 is formed of a plurality of laminations of magnetic material and includes a rotor receiving bore 17 and energizing windings or coils 18 mounted in stator slots (not shown) provided in the stator core 16. Rotatably mounted within the bore 17 provided by the stator core 16 and excited magnetically therefrom is a rotor assembly 20.

The rotor assembly 20 includes a rotor core 21, a plurality of rotor conductors 22, 22', 23, 23' (only portions of which are shown in FIG. 1), a pair of rotor end rings 24, 25, a balance weight 26, and a shaft 27. The rotor core 21 is formed of a stack of magnetic laminations which are held in juxtapositioned relationship by the rotor end rings 24 and 25. The rotor conductors 22, 22', 23, 23' are joined in short circuit relationship by the rotor end rings 24, 25. It will be seen that the rotor core 21 is nonrotatably mounted on shaft 27. In order to provide for circulation of cooling fluid through the motor 11, a ventilating fan 19 is carried by shaft 27 and rotates with the shaft to cause a forced circulation of air through the ducts provided in the rotor core 21.

In accordance with the invention, the balance weight 26 is located along a radial face of the end ring 25. Interposed between the radial face of the end ring 25 and the balance weight 26 is an insulating spacer 50 which may be formed of any suitable insulating material having good dielectric properties so that the balance weight 26 is insulated electrically from the rotor end ring 25. The insulating material used in the illustrative embodiment of the invention was a polyethylene glycol terephthalate resin.

Referring now to both FIGS. 1 and 2, the balance weight 26 is secured to the end ring 25 by lugs 51, 52 which are integrally formed therewith and peened over. It will be seen that the lugs 51, 52 are also insulated from the balance weight 26 by means of the insulating collars 53, 54. The balance weight 26 is of arcuate configuration and subtends in an angle of approximately 180 degrees. The size of the balance weight 26 may be varied as required to provide the desired balancing force.

Although in the illustrative embodiment of the invention shown in FIGS. 1 and 2, the spacer 50 and insulating collars 53, 54 were fabricated of synthetic plastic insulating material in order to electrically insulate the balance weight 26 from the end ring 25, it will be apparent that the balance weight 26 may be effectively insulated from the rotor end ring 25 by applying a plastic coating or ceramic insulating coating to the balance weight 26 before it is mounted on the end ring 25. The balance weight 26 is preferably formed of nonmagnetic material such as brass or copper and, if desired, may be of unitary or laminated construction. In the illustrative embodiment of the invention, the balance weight 26 was fabricated of brass.

Referring again to FIG. 1, the single piston compressor 12 is shown for the purpose of disclosing a useful application of an induction motor 11 incorporating the balance weight arrangement in accordance with the invention. The compressor 12 includes a cylinder head assembly 32, a compressor body 33, a cylinder 34, intake and exhaust valves 35 (only one of which is shown), a piston 36, a piston rod 37, journaled on the crankshaft portion of shaft 27, an end cap 38 and a support assembly 39 attached to a hermetically sealed casing 40. A spring 41, a tie bolt 42 and bracket 43 rigidly attached to the casing 40 comprises the support assembly 39 for the motor 11 and compressor 12.

In the embodiment of the invention illustrated in FIG. 1, the squirrel cage structure was a die casting of aluminum. It will be appreciated that an aluminum alloy or other conducting material capable of being die cast and possessing the requisite electrical properties may be used. The cage structure consists of the rotor conductors 22, 22', 23, 23' extending through skewed slots of the rotor laminations. The end rings 24, 25 at each end extend circumferentially of the rotor 21 at the end faces thereof and are integrally joined to the conductors 22, 22', 23, 23'. The rotor assembly 20 is nonrotatably secured to shaft 27 by any suitable means; such as an interference fit or by keying the rotor 21 to shaft 27.

Having reference now to FIGS. 3 and 4, I have shown therein another modification of the balance weight arrangement in accordance with the invention wherein a balance weight 55 is secured to an end ring 56 of a rotor assembly 57 by means of a pair of screws 58, 59 fabricated of insulating material such as a high strength synthetic resin. In this illustrated embodiment of the invention a polyamide resin, commonly known as nylon, was employed. The rotor construction is of the squirrel cage type. The rotor conductors (not shown) are disposed in skewed slots in the same manner as the conductors shown in FIG. 1 and are die cast integrally with the rotor end rings 56, 60 disposed at the ends of the rotor 61.

As is best seen in FIG. 4, the balance weight 55 is axially spaced from the radial face of the rotor end ring 56. The insulating washers 62 are provided to axially position the balance weight 55 and were also fabricated of a polyamide resin. Thus, the screws 58, 59 and the insulating washers 62 provide an insulated support for the rotor end ring 55. It will be seen that elongated slots 63, 64 are provided in the balance weight 55 so that adjustments can be made in the position of the balance weight during the balancing operation.

In FIGS. 6 and 7, I have illustrated another modification of the balance weight mounting arrangement in accordance with the invention wherein a balance weight 65 is secured to mounting pads 66, 67 integrally formed on the rotor end ring 73 and insulated therefrom by the insulating collars 68, 69. Rotor assembly 70 is also of the squirrel cage type and includes a rotor 71 having end rings 72, 73 disposed at the ends thereof.

In some applications it is necessary to locate the center of gravity of the balance weight 65 at a given axial distance from the center of the rotor 61 and provide a predetermined amount of unbalance. One of the advantages of using integrally formed mounting pads 66, 67 is that a balance weight can be readily fixed in a predetermined axial position. A further advantage is that the need for cleaning off the casing ports on a rotor end ring for a balance weight seat is eliminated since the casting ports become the rivet lugs for the balance weight. Thus, this arrangement provides an advantage in casting, in addition to the principal advantage of improved starting torque as will hereinafter be more fully described.

It will be appreciated that the balance weight mounting arrangement of the present invention is particularly adaptable to motor applications where it is required that a motor rotor be designed with a predetermined amount of unbalance. For example, where the motor is used to drive a single piston compressor as shown in the exemplification of the invention illustrated in FIG. 1, it is necessary that the motor rotor provide the balancing force required to compensate for the unbalance contributed by the crankshaft. Thus, a motor used to drive a single piston compressor must be designed with a definite unbalance so that the rotating mass system is statically and dynamically balanced. In such applications proper balancing of the system requires a relatively large balance weight to be located at a specified distance axially from the rotor iron. Conventionally, steel weights have been in use to provide the required unbalance in the motor rotor. It was found that the extent to which the starting torque is affected by the balance weight depends upon the amount of steel used in the balance weight, the location of the balance weight from the rotor iron and the location of the balance weight from the centroid of the current passing through the rotor end rings.

In FIG. 7, I have illustrated a plot of the torque measurements expressed in ounce feet for one revolution of the rotor under locked rotor conditions for a motor of the type illustrated in FIGS. 1 and 2 using a conventional steel balance weight which was not insulated from the rotor end ring 25. The tangential line A drawn approximately through the minimum points of the curve represents the minimum starting torque. In FIG. 8, I have illustrated a plot of the locked rotor torque measurements against one revolution of the rotor for an identical motor in which the improved balanced weight arrangement of the invention, as shown in FIGS. 1 and 2, was employed. Line B represents the minimum starting torque for this motor.

From a comparison of the locked rotor torque curves, it will be seen that an increase in the minimum starting torque is obtained by the arrangement of the present invention. Further, it will be noted that the pulsating torque has been eliminated. It will be appreciated that a pulsating torque is objectionable since it causes vibrations in the motor windings which may result in an insulation breakdown. It was also found that the improved arrangement provided an increase in maximum running torque and an improvement in the performance of the motor due to lower losses as compared with conventional balance weight arrangements.

From the foregoing description, it will be apparent that the balance weight arrangement in accordance with the invention provides many advantages over conventionally mounted balance weights. Thus, the arrangement of the present invention makes it possible to obtain an increase in the minimum starting torque and an increase in the maximum running or breakdown torque of a motor. An improvement is realized in the performance of the motor due to the lower resultant losses. As compared with conventional balance weight arrangements, the temperature rise in the rotor is less due to the lower current in the end rings, and the possibility of hot spots in the rotor end ring due to unsymmetrical resistance in the end ring is minimized. Further, due to the elimination of severe torque pulsations, the effect of vibration resulting therefrom on the motor and compressor are minimized.

Although in the exemplification of the invention, I have described a use of a balance weight arrangement wherein only one balance weight is employed, it will be appreciated that more than one balance weight may be used in accordance with the invention. It will be understood that two balance weights of equal mass when moved relative to each other will produce the same results as a number of balance weights having different masses.

It will be understood that the various embodiments of the invention as described herein are illustrative examples thereof and that the invention is not limited to such embodiments. Further, it will be apparent that many modifications of the particular embodiments of the invention described herein may be made. It is intended, therefore, by the appended claims, to cover all such modifications that fall within the true spirit and scope of the invention.

What I claim as new and desire to secure by Letters Patent of the United States is:

1. In an electric motor having a stator and a frame assembly, a shaft, a rotor mounted on said shaft and comprised of a body of magnetic material formed with a plurality of slots for accommodating rotor conductors, a plurality of rotor conductors positioned in said slots, means for rotatably supporting said shaft, a pair of end rings disposed at the respective ends of said rotor, and joining said rotor conductors, at least one balance weight secured adjacent said end ring, said balance weight being comprised of nonmagnetic material, and electrical insulating means interposed between said end ring and said balance weight to electrically insulate said balance weight from said end ring.

2. A rotor assembly for use in an electric motor comprising a plurality of conductors, a rotor formed of a stack of laminations having a plurality of slots accommodating said conductors and extending through said rotor, said rotor conductors being disposed in said slots, a pair of end rings disposed at the end faces of said rotor and short circuiting said conductors at the ends thereof, at least one balance weight attached to one of said end rings, an insulating means interposed between said balance weight and said end ring, said balance weight being comprised of nonmagnetic material and said insulating means electrically insulating said balance weight from said end ring.

3. A rotor assembly for use in electric motors, said rotor assembly comprising a rotor formed of a body of magnetic material having a plurality of slots for accommodating rotor conductors, a plurality of rotor conductors disposed in said slots, a substantially annular-shaped rotor end ring disposed at each end of the said rotor and joining said rotor conductors, at least one of said end rings having a radial surface, a balance weight being disposed along at least a portion of said radial surface and attached to said end ring to provide a balancing force for said rotor assembly and mass system associated therewith during operation, said balance weight being comprised of nonmagnetic material and being electrically insulated from said rotor end ring.

4. In an electric motor having a stator and a frame assembly, a shaft, a rotor mounted on said shaft and comprised of a plurality of laminations, a plurality of rotor conductors, said rotor being formed with a plurality of slots for accommodating said rotor conductors, said plurality of conductors being positioned in said slots, a pair of end rings disposed at the respective ends of said rotor and joining said conductors, at least one balance weight attached to said end ring in order to balance said rotor and mass system associated therewith during operation, said balance weight being formed of nonmagnetic material, and means for electrically insulating said balance weight from said rotor end ring.

5. A rotor assembly for use in an electric motor, said rotor assembly comprising a shaft, a rotor mounted on said shaft and formed of a stack of laminations having a plurality of slots for accommodating rotor conductors, a plurality of rotor conductors disposed in said slots, a substantially annular-shaped rotor end ring disposed at each end of said rotor and joining said conductor bars, at least one balance weight attached to said end ring, said balance weight being formed of nonmagnetic material and being electrically insulated from said rotor end ring.

6. A rotor assembly for use in an electric motor comprising a rotor formed of a stack of laminations having a plurality of slots for accommodating rotor conductors, a plurality of rotor conductors disposed in said slots, a pair of end rings disposed at the respective ends of said rotor and joining said conductors, at least one balance weight comprised of nonmagnetic material, and an insulating means for attaching said balance weight to said end ring in spaced relation therewith, said means providing insulated support for said balance weight.

7. A rotor assembly for use in an electric motor, said rotor assembly comprising a rotor formed of a stack of laminations having a plurality of slots for accommodating rotor conductors, a plurality of rotor conductors disposed in said slots, a rotor end ring disposed at each end of said rotor and joining said conductor bars in short circuit relation, at least one balance weight formed of nonmagnetic material, one of said rotor end rings having integrally formed thereon at least a pair of mounting pads, said balance weight being secured thereto and axially spaced from said rotor end ring, and insulating means interposed between said mounting pads and said balance weight to electrically insulate said balance weight therefrom.

References Cited in the file of this patent

UNITED STATES PATENTS

| | | |
|---|---|---|
| 2,316,635 | Staak | Apr. 13, 1943 |
| 2,558,737 | Darnell | July 3, 1951 |